Figure 1:
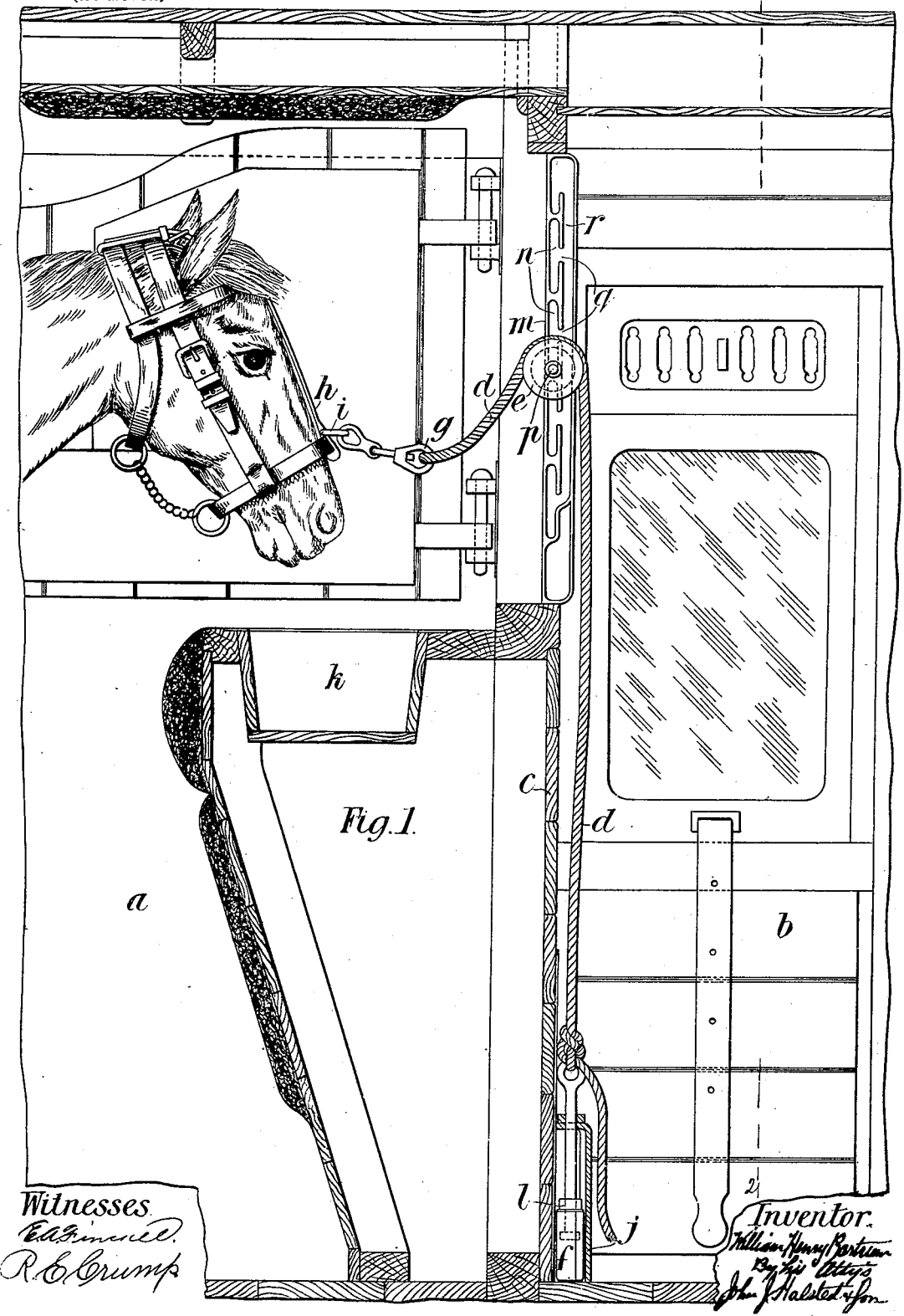

No. 650,524. Patented May 29, 1900.
W. H. BARTRUM.
MEANS FOR TETHERING HORSES OR OTHER ANIMALS IN STABLES, &c.
(Application filed Dec. 24, 1897.)
(No Model.) 2 Sheets—Sheet 1.

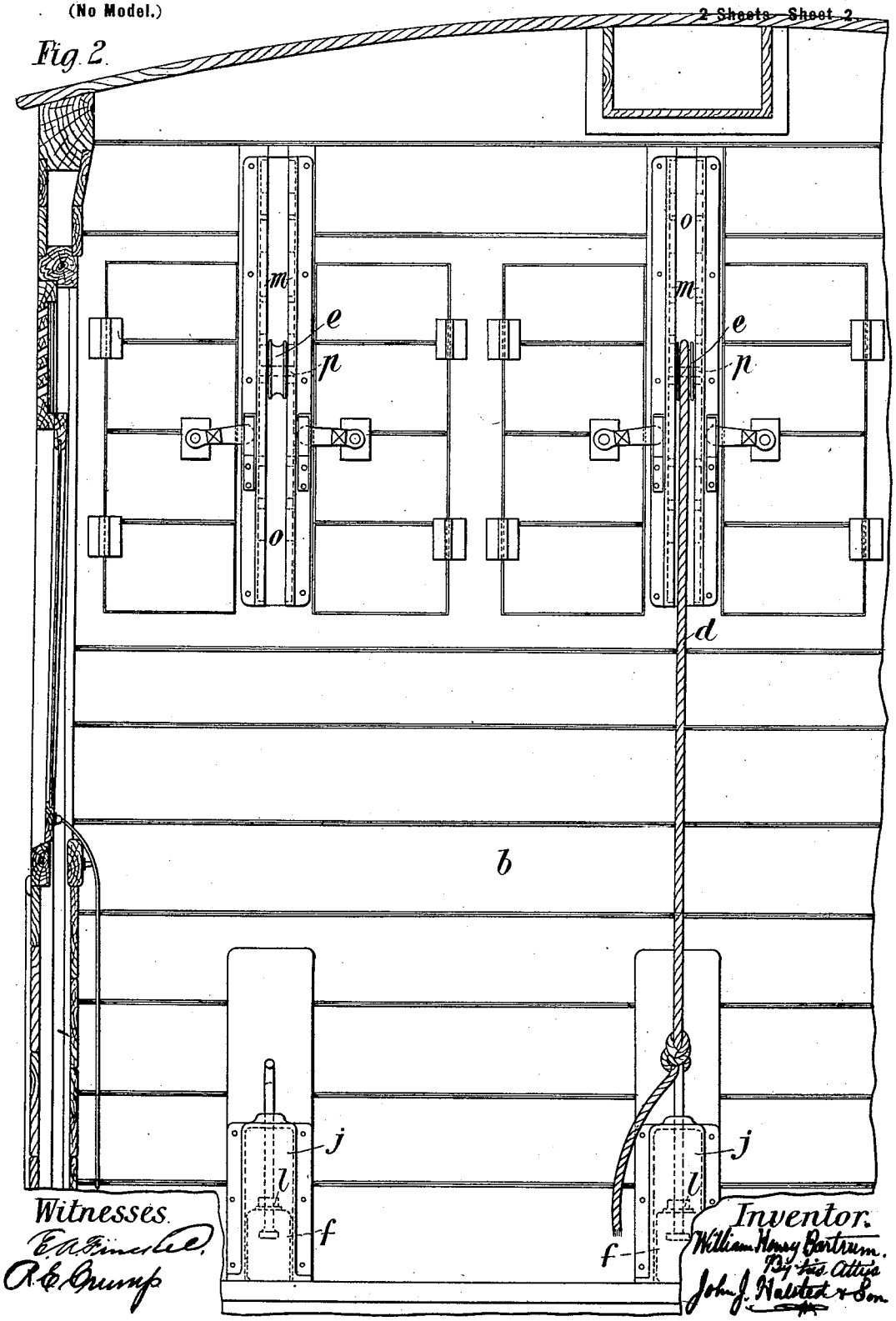

UNITED STATES PATENT OFFICE.

WILLIAM HENRY BARTRUM, OF DERBY, ENGLAND.

MEANS FOR TETHERING HORSES OR OTHER ANIMALS IN STABLES, &c.

SPECIFICATION forming part of Letters Patent No. 650,524, dated May 29, 1900.

Application filed December 24, 1897. Serial No. 663,419. (No model.)

*To all whom it may concern:*

Be it known that I, WILLIAM HENRY BARTRUM, M. R. C. V. S. L., a subject of the Queen of Great Britain, residing at Derby, England, have invented new and useful Improvements in Means for Tethering Horses or other Animals in Stables, Traveling Horse-Boxes, and the Like, of which the following is a specification.

This invention relates to improved means for tethering animals and chiefly horses in stables, traveling horse-boxes, and the like; the object of the said invention being to reduce to a minimum the liability of animals becoming injured by getting their feet and legs entangled with the ties or tethers, as is frequently now the case.

According to the present invention the tether instead of extending from the halter downward extends from the halter to a point level with or above the animal's head, a roller being arranged over which the tether or tie rope or chain passes, the said tether at one end being attached to special headstall and secured at the other end to a weight which is free to rise and fall in a casing and in such a position that it cannot come in contact with the animal.

When my invention is applied to a traveling horse-box, I prefer that the tethering rope or chain shall pass through the partition into the compartment in which the groom or attendant usually sits, (the casing and weight before mentioned being preferably placed in this compartment,) so that the movements of the chain shall afford an indication to the attendant as to whether or no the animal is restless.

To enable my invention to be fully understood, I will describe the same by reference to the accompanying drawings as applied to a traveling horse-box, in which—

Figure 1 is a longitudinal section of so much of a horse-box as is necessary to illustrate the application of my invention thereto; and Fig. 2 is a section on the line 2 2, Fig. 1.

$a$ is the compartment, containing the usual padded stalls, and $b$ is the compartment for the attendant, $c$ being the partition between the said compartments.

$d$ is the tethering-rope, which is passed over the pulley $e$ in the partition and which at one end carries a weight $f$ and at the other end $g$ is adapted for attachment to the headstall $h$, the said headstall being of special construction in so far that the eye or ring $i$ for the attachment of the tethering-rope is upon the top of the nose-strap instead of on the under side of the same, as has been heretofore usual. The weight $f$ works in a chamber formed by a casing $j$ and is of such length that it allows of the horse lowering his head sufficiently to feed out of the manger $k$. An india-rubber or other pad $l$ is preferably arranged at the upper end of the weight in order to cushion the said weight when the animal's head is lowered sufficiently to cause the weight to strike the upper end of the chamber.

The pulley $e$ may be permanently fixed in a suitable aperture in the partition $c$; but I prefer to arrange it so that its position can be adjusted. As shown in the drawings, two racks $m$ $m$, each provided with a series of recesses $n$ $n$, are fixed at the two sides of a vertical slot or aperture $o$ in the partition $c$, and the pulley $e$ is mounted upon an axle $p$, adapted to be placed in either of the pairs of opposing recesses $n$ $n$. The openings $q$ $q$, through which the axle is introduced into the recesses, communicate in each rack with a guide-channel $r$. It is to be understood that any other suitable means may be adopted for adjusting the height of the pulley in the partition.

Instead of using a rope for tethering I sometimes make use of a chain. In this case, however, I prefer to provide the chain with a rope section, so that in case of necessity the rope could be severed in order to effect the release of the animal. This rope will also permit of regulating the length of the tether to suit the different animals to be secured. With this arrangement a horse "bumped" off his feet can readily regain them, which with the present method of tethering is very difficult and frequently impossible.

When my invention is applied in a stable, the pulley may be arranged, as hereinbefore described, in the wall or partition behind the manger, or, if this is impossible, the pulley must be mounted so that the rope and weight can run in a casing arranged behind the manger, so that at no time is it possible for the animal to get his legs entangled with the tethering rope or chain. It is to be understood that in all cases the pulley may be adapted to be adjusted as to height, if this is deemed advisable.

Having now particularly described and ascertained the nature of my said invention and in what manner the same is to be performed, I declare that what I claim is—

1. In combination with the pair of rack-bars severally fixed at the two sides of a vertical slot in a partition and each having the described series of recesses $n$, openings $q$, and a vertical guide-bar back of such openings forming in conjunction with the body of the rack, a guide-channel, a pulley having an axle adapted to be lodged in the corresponding recesses of the two racks and to be shifted at will from one pair of recesses to another, and to be guided while being so shifted, by means of said channel, all as shown and described.

2. In combination with the parallel racks having the described recesses, openings and guide-channels and applied to the sides of a slit in a partition, the axled pulley, the weighted tethering-rope passing between the racks, and a pad $l$, on the upper end of the weight working in a covered casing, all as set forth.

WILLIAM HENRY BARTRUM.

Witnesses:
H. D. JAMESON,
ALFRED NUTTING.